US007541885B2

(12) United States Patent
Mecca

(10) Patent No.: US 7,541,885 B2
(45) Date of Patent: Jun. 2, 2009

(54) INFINITE RADIO FREQUENCY SPECTRUM TRANSCEIVER

(76) Inventor: John Mecca, 119 Whittier Dr., Kings Park, NY (US) 11754

( * ) Notice: Subject to any disclaimer, the term of this patent is extended or adjusted under 35 U.S.C. 154(b) by 84 days.

(21) Appl. No.: 11/758,760

(22) Filed: Jun. 6, 2007

(65) Prior Publication Data

US 2008/0303602 A1    Dec. 11, 2008

(51) Int. Cl.
*H03B 5/00*    (2006.01)
*H03B 29/00*    (2006.01)
(52) U.S. Cl. .............................. 331/187; 331/78; 331/96
(58) Field of Classification Search .................. 331/78, 331/117 R, 117 FE, 117 D, 167, 187, 96
See application file for complete search history.

(56) References Cited

U.S. PATENT DOCUMENTS 7,245,883 B2 *   7/2007   Nakatani et al. .............. 455/78

* cited by examiner

Primary Examiner—David Mis

(57) ABSTRACT

The present invention "Infinite Radio Frequency Spectrum Transceiver" (IRFS for short) relates to a circuit that emits and receives the complete radio frequency spectrum transmission as it exists from 0 hertz to the region where radio frequency ends to j the infrared. Such a circuit causes infinite bandwidth output gain evenly over the entire radio frequency spectrum, can be readily used as a noise source, where such output even gain across the spectrum. Such circuit in its simplest form can be used as a noise source, subsequent use of single circuits organized in series or parallel increase power where they can readily be used as a radio frequency jamming array. Additional insertion into specific points of the circuit can be used to transmit a signal across the bandwidth where such signal takes on the attributes of all frequencies and appears as higher and lower frequency as amplitude gain at such points across the bandwidth. Additional use of various filters can restrict the frequency of transmission. As a receiver signals of all and any kind will show up across the bandwidth viewed on a spectrum analyzer or other analytical instrument to decipher such received signals. As a single component to use in emitting broadband signals for radio frequency beacons.

6 Claims, 2 Drawing Sheets

Figure 1.
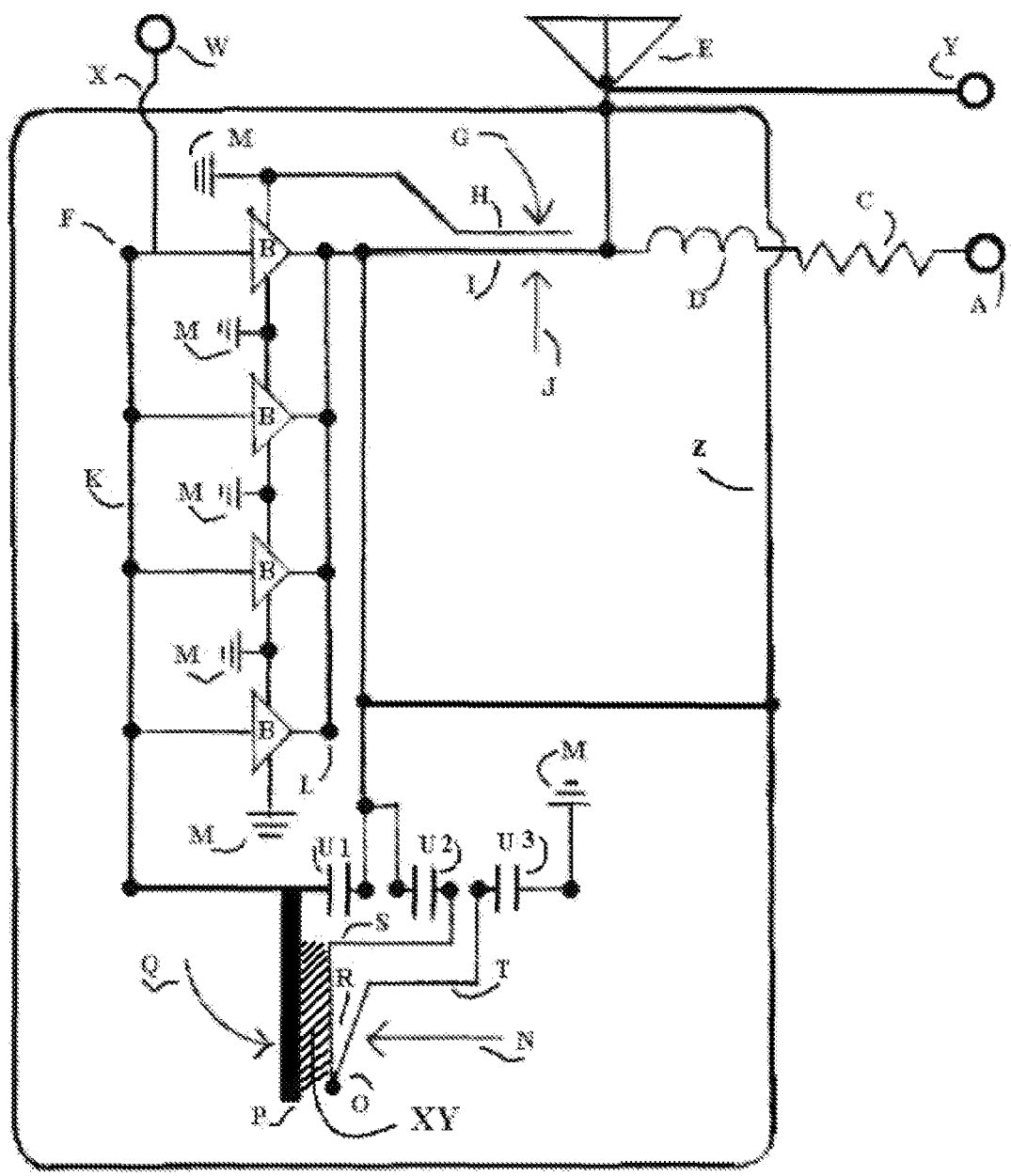
Figure 2. 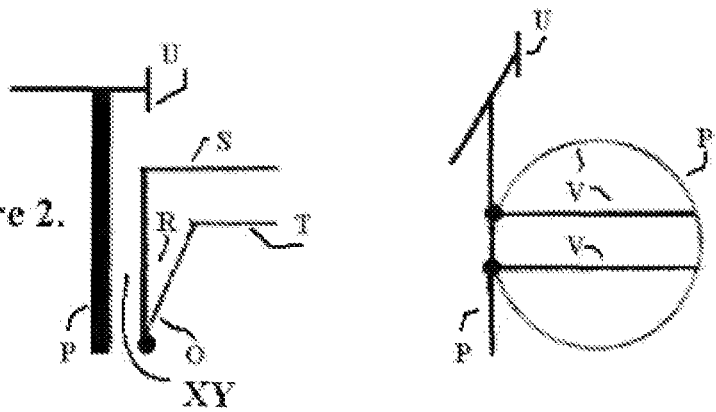 Figure 3.

Figure 4.
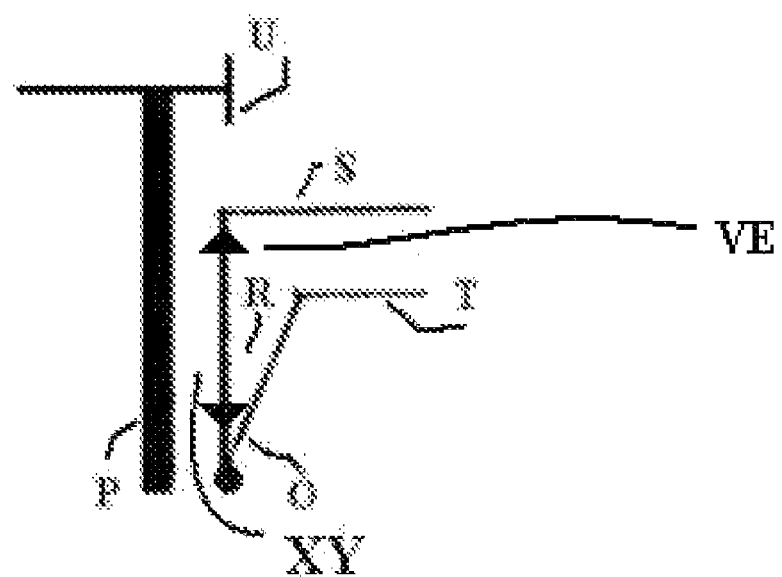
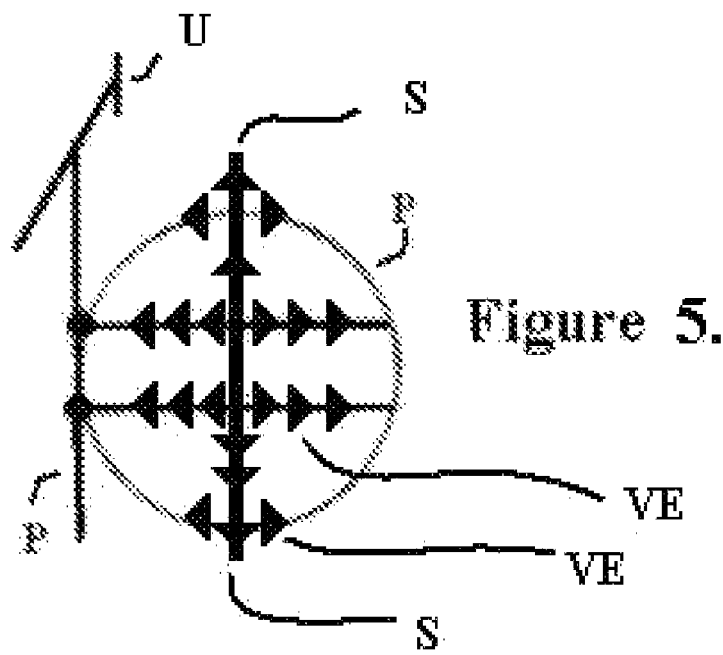
Figure 5.

US 7,541,885 B2

INFINITE RADIO FREQUENCY SPECTRUM TRANSCEIVER

BACKGROUND OF INVENTION

Broadband transceivers and noise sources have had limitations regarding the bandwidth of coverage. Where previously such electronic circuits were for limited portions of the electromagnetic spectrum and required multiple circuits to cover the whole radio frequency spectrum. The present invention a circuit overcomes such previous limitations by utilizing oscillatory reverberations in generating broader band gain of signal across the whole of the radio spectrum up to and to its end before the infrared. Where broadband transceiver actions are desired and or noise or jamming are required such a circuit, this circuit overcomes limitations of previous art where there were multiple stages needed to accomplish full spectrum output across the electromagnetic spectrum.

SUMMARY OF INVENTION

The circuit Infinite Radio Frequency Spectrum Transceiver (IRFS for short) is an oscillator where the input and output from a transistor, monolithic microwave integrated circuit of preference a Cascadable Silicon Bipolar MMIC Amplifier or can be generally any gain block or device has the input and output feedback into one another using an inductor or capacitor, where one leg of that inductor or capacitor is connected to the input side of the gain device and the other is connected to the output side of such a gain device; whereupon that sum of feedback oscillation on the input reception side of that gain circuit is isolated by utilizing that input side of that inductor or capacitor as a portion of a secondary oscillation element here defined to be known as the "primary oscillation inductor or capacitor leg".

That the isolated feedback oscillation on the input reception side of that gain circuit is brought into inductive or capacitive proximity to optimally a "secondary dual inductor or capacitor". The "secondary dual inductor or capacitor" is comprised of two separate inductors or capacitors. The two inductors or capacitors being understood to the first and second of the inductors or capacitors of the "secondary dual inductor or capacitor", so then the first inductor or capacitor has one of its legs connected to the output side leg of the inductor or capacitor of the "primary oscillation inductor or capacitor leg". The second inductor or capacitor has one of its legs connected to the ground of the gain device. These connections leave one leg free from each of the first and second inductor or capacitor of the "secondary dual inductor or capacitor" and these two free legs are connected to each other at their ends forming the "secondary oscillation inductor or capacitor leg". An inductor or capacitor being defined as interchangeable, wherein an inductor in regard to its definition for this invention can and is two bare wires or plates in proximity to each other causing exchange of magnetic, electric and radio frequency fields; such that in the writing of the description, operation and claims of this invention can have the one word being capacitor used where inductor is then inferred.

The isolated "primary oscillation inductor or capacitor leg" and the "secondary dual inductor or capacitor's" isolated "secondary oscillation inductor or capacitor leg" are brought into proximity to each other, where they are disposed to cause secondary oscillations that then feedback into the input and output sides of the gain device. Electromagnetic spectrum oscillations from zero hertz to the infrared are cause by secondary and tertiary regenerative oscillations achieved as even gain across the spectrum through addition of those oscillations into the ground, input and output of the circuit.

Those magnetic and electric oscillations of the circuits radio frequency oscillations are furthermore brought into proximity between the "primary oscillation inductor or capacitor leg" and the "secondary oscillation inductor or capacitor leg" where the "primary oscillation inductor or capacitor leg" has a sprue inductor capacitor coming off the "primary oscillation inductor or capacitor leg" at ninety degrees so that it crosses the "secondary oscillation inductor or capacitor leg" obliquely at ninety degrees; this perpendicular intersection of the "primary oscillation inductor or capacitor leg" and the "secondary oscillation inductor or capacitor leg" causes the oscillations at that intersection to back feed their resultant in reverse at that perpendicular oblique intersection point so that sum addition of the oscillations is forced to infinity. This point of intersections magnetic and electric constituents are at ninety degrees where they are biased in a relative neutral state from supporting each others oscillation due to the magnetic and electric fields from the "primary-oscillation inductor or capacitor leg" and the "secondary oscillation inductor or capacitor leg" having such neutralized impetus to support each others oscillation causes this very neutral state to support an interaction of supra oscillation from that that "perpendicular oblique intersection point". This supra oscillation feeds back into the several input legs of the gain device causing even gain of infinite frequency across the electromagnetic spectrum. Where such as is described being where the two inductors being "primary oscillation inductor or capacitor leg" and the "secondary oscillation inductor or capacitor leg", where they are inducting each other have separately and individually the relative issue of the "right hand rule" where such electric current and magnetic field defined by that rule, have that fundamental rule active in both directions on each of the members of the intersection of the "perpendicular oblique intersection point"; where at that intersection those fields brought by proximity to intersect neutralize the cumulative support of each of the separate inductors at the intersection of the "perpendicular oblique intersection point" where such neutralized magnetic and electric fields (including current drift inside and on the surface of those conductors) to simultaneously attract and repel as a secondary reaction right hand rule oscillation reverberating away from and over the neural point through induction at the point of intersection.

The perpendicular inductors are posited crossing each other at a proximal distance where their electromagnetic fields interact in the ways described throughout this work, there are of course variables that can accomplish the same actions described. Such an alteration would be to have the perpendicular inductors instead run parallel to each other, where this can be made to work upon substantial calibration the preferred embodiment justifies the use of perpendicular inductors where they cross each other perpendicularly.

The IRFS circuit has an input connection for receiving signals and an output connection for sending signals. The input connection for receiving signals has the attribute that all signals entering the circuit will appear on the output connection signal all across the entire spectrum and not only at the point of the spectrum of the input signals frequency relevance. As well the device can be used to increase gain by using several of these circuits in series and parallel to increase power and separately db gain. Such devices can as single and separate entities be used to interact together by inductive and or radio frequency interaction to each other besides hard conductor connection. The use of such devices together in parallel or series for receiving, sending and noise generation can be used also for further oscillation interference with each other causing other general effects of noise or interdiction of signals as an RF energy source or jamming device.

In one embodiment a transceiver includes a gain block having an input and output and an individual connection position for input of signal and output of signal. A first two lead capacitor is included has the first lead connected to the input of the gain block and the second other lead to the output of the gain block. A second two lead capacitor has the first one of the leads connected to a second capacitor leg mid way along its length where that lead connects to the input side of the gain block and the other second lead is connected to a third capacitors second leg. A third capacitor has its first leg connected to the ground of the gain block and its second leg connected to the second leg of the second capacitor. An oblique protrusion of a single or multiple conductors extends from the first lead of the first capacitor. The second capacitor's second lead and the third capacitor's second leg are joined together at their leads farthest tip. A juxtaposition of the second capacitor's second lead and the third capacitors second leg joined together at their leads farthest tip are placed in proximity at approximately ninety degrees to the oblique protrusion of a single or multiple conductor from the first lead of the first capacitor. Another embodiment further includes a set of two stabilizing inductor or capacitor leads, comprised of two conductive elements where the first conductor lead has one end connected to ground and the other lead being the output of the gain block device. Mobility of one of the inductors of stabilizing inductors is implied by physical adjustment means. A single conductor loop ringing the transceiver has a plurality of conductors radiating inward towards the transceiver circuit and said inwards radiating elements terminate on the output conductor of the gain device. In another embodiment the transceiver including two or more separate inductors in proximity to each other obliquely, where such inductors in proximity to each other obliquely present means for electromagnetic fields to crisscross each other. Electromagnetic fields means by intersection of said inductors affect each others electromagnetic fields for causing electromagnetic reaction backwards and forward away from the proximity region of elements of the inductors affecting induction of electromagnetic energy backwards and forwards where such energy back feeds into the input, output and ground of the gain block device. The inductors' electromagnetic energy backwards and forwards reaction causes to harmonically re-inject electromagnetic energy into the gain block device. In another embodiment the capacitors, which form a common, lead and intersect proximally and obliquely with the input leg of the first capacitor effect harmonic re amplification of signal into the gain block device. In another embodiment the perpendicular arranged inductor means interact to form means for harmonic amplification of signal, includes one or a plurality of oblique conductors radiating means from the first capacitors first leg. In another embodiment a capacitor bank and perpendicular inductor arrangement means causes even db gain and increase all frequencies and signals internal and external to the gain block device to infinity independent of the gain block device. In another embodiment a plurality of capacitor means coupled to crossing oblique inductor means functions by a feedback from a neutral magnetic and electric region (according to the right hand rule of electrodynamics) between the perpendicular members means by neutralized magnetic and electric interaction between two separate inductors as means to cause suspension of magnetic moment that normally prevents reflection of signal to cause said means to reflect signal and further allow signal passage through perpendicular region into the input, output and ground of the gain block device. In another embodiment an harmonic frequency multiplier circuit means having perpendicular elements in proximity promoting exponential harmonic increase in frequency across the known radio frequency bandwidth by utilizing forward and backward reflection away from axis field region between them, means of causing reflection from such perpendicular inductors from intersection of magnetic and electric fields present on and around such perpendicular inductor leads where such leads from capacitors terminate in juxtaposition to each other perpendicularly. The perpendicular crossing leads of capacitors in juxtaposition to each other as a means of promoting the intersection of the fields from the two crossing lead inductors cause as a means the reflection of electromagnetic energy at that intersection of the two inductors fields to cross the intersection while simultaneously being reflected backward on both inductors. Means where such reflection and continuance of electromagnetic energy means re-enters the gain block device as additional means of increasing frequency bandwidth and thereupon that means of contribution to the frequency bandwidth is outputted by the amplifier to further add to the frequencies the harmonic frequency multiplier circuit over again infinitely as a means continually raising the frequency to higher and higher frequencies as well as to contributing to stable db increase over the entire electromagnetic frequency range. In another embodiment the harmonic frequency multiplier circuit means is independent of the gain block device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an exemplary circuit diagram for a transceiver module in accordance with an embodiment of the present invention;

FIG. 2 is an exemplary circuit diagram for primary and secondary oscillation legs for the transceiver module in accordance with an embodiment of the present invention;

FIG. 3 is view of an exemplary circuit for primary and secondary oscillation legs for the transceiver module in accordance with an embodiment of the present invention;

FIG. 4 is an exemplary depiction of electromagnetic energy flow of the circuit in FIG. 2; and FIG. 5 is an exemplary depiction of electromagnetic energy flow of the circuit in FIG. 3.

Unless otherwise indicated illustrations in the figures are not necessarily drawn to scale.

The IRFS drawings are of a preferred embodiment are (FIG. 1.) where the gain device is a parallel configuration of four separate mmic's and where arrangement of the "primary oscillation inductor or capacitor leg" and the "secondary oscillation inductor or capacitor leg" in proximity to each other as a portion of the circuit are within a surrounding conductor used to stabilize the circuit's oscillatory reverberations from intersecting with and from other regions of the circuit and the environment. A further inductor or capacitor for stability is at the position of the output of the gain device where that is one leg of an inductor and the other side of the inductor or capacitor is connected to ground. Other FIG. 1. and FIG. 2. are of the "primary oscillation inductor or capacitor leg" and the "secondary oscillation inductor or capacitor leg" in several views for observation of the relation regarding their proximity to each other.

DETAILED DESCRIPTION OF THE PREFERRED EMBODIMENT

The IRFS drawings FIGS. 1,2 and 3 have (FIG. 1.) showing a preferred embodiment of an "Infinite Radio Frequency Spectrum Transceiver" or (IRFS for short) gain device as the foundation of the oscillator where there is a surrounding conductor Z is ringing the circuit for stability of the circuit. Where A is the input voltage nomenclature often seen by letters designated as Vcc. Letters M are ground. Letter C is resistor for circuit operation and D an optional inductor preventing feedback to and from the supply voltage Vcc. Connections are designated as F being a large circular dot common in electronics nomenclature; letter X is common nomenclature where there a crossing of a wire without effect as in jumping over another wire. Letter W is the input connection of the gain circuit comprised of transistors, mmic, gain blocks and the like. Letter B are transistors, mmic, gain blocks and the like. Letter E is the emitter and or antenna. Letter Y being an additional output for reference monitoring equipment and or output inductively or capacitively for connection to other of the same device in series, parallel or through RF coupling. Letter K is the common connection of the input side of the transistors, mmic, gain blocks and the like. Letters G, H, I and J are the inductor or capacitor for circuit stability where I is stationary and its counterpart of opposing inductance is inductor H. Inductor H being variable and movable for optimal or optional continual variability is in isolated proximity to inductor I. The arrows G and J show the relationship wherein inductors H and I have the distance between them or their inductance and or capacitance changed for stability, instability, modulation or other purposes. Letter L is the common conductor connecting the input to each transistor, mmic, gain block and the like.

The IRFS drawings FIGS. 1,2 and 3 have (FIGS. 2 and 3) further defined. Letters U1, U2, and U3 are inductors or capacitors of "primary oscillation inductor or capacitor leg" and the "secondary oscillation inductor or capacitor leg". Where shaded area XY is the "perpendicular oblique intersection point" exists between the "primary oscillation inductor or capacitor leg" referenced as P and "secondary oscillation inductor or capacitor leg" referenced as O. Letter R is the vee shaped area between the "secondary oscillation inductor or capacitor leg's" and is comprised of one inductor capacitor leg from both; is both a function is for stability where the two legs from it being S and T known as a single entity are known as O are double conductors perpendicularly presented in proximity to "secondary oscillation inductor or capacitor leg" referenced as P. Fewer or more "primary oscillation inductor or capacitor leg" and the "secondary oscillation inductor or capacitor leg" sections may be used without departing from the scope and spirit of the invention.

Modifications by way of miniaturization and or use of nano sized objects or materials including meta-materials are understood to be within the understanding of how the organization and means of relationship towards construction of the IRFS circuit without departing from the scope and spirit of the invention, where such alternate fabrication technologies intersect with the principle of the neutral state to support an interaction of supra oscillation from that that "perpendicular oblique intersection point" V, R, shaded area XY of fields where inductive and or capacitive members are inducting each other have separately and individually being the relative issue of the "right hand rule" where such electric current and magnetic field defined by that rule, have that fundamental rule active in both directions on each of the members of the intersection of the "perpendicular oblique intersection point"; where at that intersection those fields brought by proximity to intersect neutralize the cumulative support of each of the separate inductors at the intersection of the "perpendicular oblique intersection point" where such neutralized magnetic and electric fields (including current drift inside and on the surface of those conductors) to simultaneously attract and repel as a secondary reaction right hand rule oscillation reverberating away from and over the neural point through induction at the point of intersection; such portion of the circuit described as being s the "primary oscillation inductor or capacitor leg" and "secondary oscillation inductor or capacitor leg". Where shaded area XY is the "perpendicular oblique intersection point" exists between the "primary oscillation inductor or capacitor leg" referenced as P and "secondary oscillation inductor or capacitor leg" referenced as O. As supported by a circuit for gain of transistor, monolithic microwave integrated circuit of preference a Cascadable Silicon Bipolar MMIC Amplifier or generally any gain block or device. Furthermore the scope and spirit of the invention will e understood to reduce the invention to solid state where air space inductor spaces are replaced by capacitors.

Letters referenced by V are the oblique ninety degree point of intersections of magnetic and electric constituents being conductors attached to P the "primary oscillation inductor or capacitor leg". These conductors V designation points being proximally and generally ninety degrees in relation from R and O, are then in proximity for induction and or capacitance where shaded area XY designated a virtual axis between V and R as then shaded area XY is the intersection of biased in a relative neutral state from supporting each others oscillation due to the magnetic and electric fields; where such neutralized magnetic and electric fields (including current drift inside and on the surface of those conductors) to simultaneously attract and repel as a secondary reaction right hand rule oscillation reverberating away from and over the neural point through induction at the point of intersection. Shaded area XY can alternatively be a solid dielectric as is needed.

Letter N and Q delineated as arrows expresses the intention or capability to alter the distance between O and P for tuning and stability of the intersection of the region axis intersection shaded area XY used to bias a relative neutral state to simultaneously attract and repel as a secondary reaction right hand rule oscillation reverberating away from and over the neural points on conductors V and O intersection being shaded area XY generally, through induction at their point of intersection again the region of field interaction shaded area XY. The following drawings FIGS. 1,2 and 3 give an overall perspective of one embodiment of the invention.

The area of virtual axis known as letter designation shaded area XY as an air space inductor can alternatively be a capacitor of fixed value or variable value.

Drawing 4 is the same as drawing number 2 where the added feature is letters VE represented by arrows denoting the direction that electric and magnetic reflections occur away from the central portion of the length of inductor S.

Drawing 5 is the same as drawing number 3 where the added feature is letters VE represented by arrows denoting the direction that electric and magnetic reflections occur away from the central portion of the length of inductor S in the background behind inductor P and V. Where on P and V the arrows show the electric and magnetic fields reflecting away from the inductor S being perpendicular to inductor V's and P at points adjacent to the intersection of S.

While the invention herein disclosed has been described by means of specific embodiments, numerous modifications and variations could be made thereto by those skilled in the art without departing from the scope and spirit of the invention set forth in the claims.

What is claimed is:

1. A transceiver module comprising:
    a gain block comprising a gain block input and a gain block output;
    a primary capacitor comprising a first primary leg and a second primary leg, said first primary leg being connected to said gain block input and said second primary leg being connect to said gain block output;
    a primary oscillation leg connected to said first primary leg and extending away from said first primary leg;
    a secondary dual capacitor comprising a second capacitor comprising a first leg and a second leg, a third capacitor comprising a first leg and a second leg, and a secondary oscillation leg, said first leg of said second capacitor being connected to said second primary leg, said first leg of said third capacitor being connected to a ground, and a distal end of said second leg of said second capacitor and a distal end of said second leg of said third capacitor being connected to form said secondary oscillation leg, where said second oscillation leg is positioned proximate said primary oscillation leg and at approximately ninety degrees to said primary oscillation leg to cause secondary oscillations that feedback into said gain block input and said gain block output such that oscillations are achieved with substantially even gain across a substantially entire electromagnetic spectrum.

2. The transceiver module as recited in claim 1, further comprising a stabilizing element comprising a conductive element connected to ground and in proximity to a lead of said gain block output where a distance between said conductive element and said lead is adjustable.

3. The transceiver module as recited in claim 2, further comprising a stabilizing element comprising a conductor loop ringing the transceiver module, said conductor loop comprising a plurality of conductors extending inward and connecting to said gain block output.

4. The transceiver module as recited in claim 3, wherein said primary oscillation leg further comprises a sprue inductor capacitor to intersect said secondary oscillation leg at approximately ninety degrees where oscillations at said intersection back feed their resultant in reverse at said intersection point such that a sum addition of said oscillations converges to infinity.

5. The transceiver module as recited in claim 4, wherein said positioning of said second oscillation leg relative to said primary oscillation leg affects harmonic re-amplification of signals into said gain block.

6. The transceiver module as recited in claim 5, wherein forward and backward reflection of electromagnetic energy at said intersection promotes exponential harmonic increase in frequency across said electromagnetic spectrum.

* * * * *

UNITED STATES PATENT AND TRADEMARK OFFICE
CERTIFICATE OF CORRECTION

PATENT NO. : 7,541,885 B2 Page 1 of 1
APPLICATION NO. : 11/758760
DATED : June 2, 2009
INVENTOR(S) : John Mecca It is certified that error appears in the above-identified patent and that said Letters Patent is hereby corrected as shown below:

On the Title Page, please insert item 73 the assignee -- Clonegenome.Org, Inc., 119 Whittier Drive, Kings Park, New York, Zip Code 11754-2339 --.

Signed and Sealed this

Eighth Day of December, 2009

David J. Kappos
*Director of the United States Patent and Trademark Office*